(12) United States Patent
Pahk et al.

(10) Patent No.: US 12,458,381 B2
(45) Date of Patent: Nov. 4, 2025

(54) APPARATUS FOR DESTROYING BIOLOGICAL TISSUE AND METHOD FOR TRAPPING BIOLOGICAL TISSUE IN FLUIDS FLOW USING THE SAME

(71) Applicant: UNIVERSITY-INDUSTRY COOPERATION GROUP OF KYUNG HEE UNIVERSITY, Yongin-si (KR)

(72) Inventors: Ki Joo Pahk, Seoul (KR); Jeong Min Heo, Seoul (KR); Jun Hong Park, Seoul (KR); Hyojun Kim, Goyang-si (KR); Kisoo Pahk, Seoul (KR); Sungmin Han, Yangju-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

(21) Appl. No.: 18/652,979

(22) Filed: May 2, 2024

(65) Prior Publication Data
US 2024/0374275 A1 Nov. 14, 2024

(30) Foreign Application Priority Data

May 10, 2023 (KR) .......................... 10-2023-0060697

(51) Int. Cl.
*A61N 7/00* (2006.01)
*A61B 17/225* (2006.01)

(52) U.S. Cl.
CPC .................................. *A61B 17/225* (2013.01)

(58) Field of Classification Search
CPC ............ A61B 17/22004; A61B 17/225; A61B 2017/00154; A61B 2017/22008;
(Continued)

(56) References Cited

U.S. PATENT DOCUMENTS

| 10,219,815 B2 | 3/2019 | Maxwell et al. |
| 2022/0323088 A1 | 10/2022 | Maxwell et al. |
| 2022/0362765 A1 | 11/2022 | Folch et al. |

FOREIGN PATENT DOCUMENTS

| KR | 10-2011-0119257 | 11/2011 |
| KR | 10-2014-0139548 | 12/2014 |

(Continued)

OTHER PUBLICATIONS

Jeongmin Heo et al., "Sonothrombolysis with an acoustic net-assisted boiling histotripsy: a proof-of-concept study", ScienceDirect Ultrasonics Sonochemistry Available online May 8, 2023, 106435.
(Continued)

*Primary Examiner* — Michael T Rozanski
(74) *Attorney, Agent, or Firm* — LEX IP MEISTER, PLLC

(57) ABSTRACT

Provided is a method for operating an apparatus for destroying biological tissue operated by at least one processor, which generates a trapping control signal for controlling movement of the biological tissue moving by a fluid. An acoustic field for controlling the movement of the biological tissue is generated by outputting a first focused ultrasound based on the trapping control signal. A second focused ultrasound is output to the biological tissue based on a destruction control signal for destroying the biological tissue whose movement is controlled by the acoustic field.

18 Claims, 12 Drawing Sheets

(58) Field of Classification Search
CPC .... A61B 2017/22011; A61B 2090/378; A61N 2007/0039; A61N 2007/0095; A61N 7/022
See application file for complete search history.

(56) References Cited

FOREIGN PATENT DOCUMENTS

| | | |
|---|---|---|
| KR | 10-2019-0110095 | 9/2019 |
| KR | 10-2022-0164241 | 12/2022 |
| WO | 2009-094554 | 7/2009 |
| WO | 2018-138634 | 8/2018 |

OTHER PUBLICATIONS

Jeongmin Heo et al., "Rapid and precise fractionation of embolus using boiling histotripsy with acoustic trapping: a proof-of-concept study", ISTU 2022 21st Annual International Symposium on Therapeutic Ultrasound Jun. 7, 2022 Toronto, CA.

Jeongmin Heo et al., "Sonothrombolysis with an acoustic net-assisted boiling histotripsy: a proof-of-concept study", Ultrasonics Sonochemistry 96 (2023) 106435, Available online May 8, 2023.

APPARATUS FOR DESTROYING BIOLOGICAL TISSUE AND METHOD FOR TRAPPING BIOLOGICAL TISSUE IN FLUIDS FLOW USING THE SAME

CROSS-REFERENCE TO RELATED APPLICATION

This application claims priority to and the benefit of Korean Patent Application No. 10-2023-0060697 filed in the Korean Intellectual Property Office on May 10, 2023, the entire contents of which are incorporated herein by reference.

BACKGROUND

(a) Field

The present disclosure relates to an apparatus for destroying biological tissue and a method for trapping biological tissue in a fluids flow using the same, and more particularly, to a technology for destroying biological tissue by controlling movement of a biological tissue in a fluids flow.

(b) Description of the Related Art

A thrombus causes thrombosis by forming a blood clot in a blood vessel and interfering with a flow of blood, and an embolism separates from the thrombus and travels through a blood vessel, causing embolization that blocks other locations in the blood vessel. Representative diseases that may be caused by the thrombus include cerebral infarction, myocardial infarction, arterial thrombosis, venous thrombosis, pulmonary embolism, pulmonary infarction, and deep vein thrombosis, etc.

The conventional method for treating thrombosis and embolization include taking anticoagulants, thrombolytic therapy, thrombotherapy, etc.

The taking of anticoagulants is a common treatment method, but it requires taking medication for several months, and there may be a risk of excessive bleeding due to complications from taking the medication for a long period of time. The thrombolytic therapy may quickly dissolve the thrombus by administering drugs through a catheter injected into a vein or artery, but there is a risk of bleeding.

The thrombotherapy is a method of inserting the catheter into the blood vessel to directly remove the thrombus, and may expect the therapeutic effect as quickly as possible, but is an invasive thrombus decomposition technology, as a result, the blood vessel is likely to be destroyed. In addition, when the curve of the blood vessel is severe, it may be difficult to target the thrombus and complications such as infection, hematoma, restenosis, and low blood pressure may occur.

Accordingly, since the conventional techniques are difficult to target and remove an embolism floating in the blood vessel, there is a risk of bleeding, so a method for treating a thrombus and embolism in a non-invasive manner without using drugs is needed. For this need, methods for destroying a thrombus or delivering drugs based on ultrasound have been developed.

An ultrasound-based thrombus destroying method is a method for injecting microbubbles into a blood vessel, irradiating ultrasound, and then destroying the thrombus through a shock caused by bursting the microbubbles. An ultrasound-based drug delivery method is a method for injecting anticoagulants in the form of bubbles into a blood vessel, then radiating ultrasound, and allowing the anticoagulants to reach thrombus while the bubbles bursting by the ultrasound.

These existing ultrasound-based thrombolysis technologies also have difficulty precisely targeting moving embolism. In addition, there is a risk of damage to surrounding tissue due to the microbubbles randomly bursting within the ultrasound irradiation range, and there is still a risk of bleeding due to the use of anticoagulants, making it difficult to precisely destroy the thrombus while minimizing side effects.

SUMMARY

The present disclosure attempts to provide an apparatus for destroying biological tissue capable of trapping a thrombus or an embolism within a blood vessel using focused ultrasound for acoustic trapping and destroying a trapped thrombus or embolism using cavitation generated by high-intensity focused ultrasound-based histotripsy, and a method for trapping biological tissue in a fluids flow using the same.

According to an embodiment of the present disclosure, there is provided a method for operating an apparatus for destroying biological tissue operated by at least one processor, which is a feature of the present disclosure for achieving the technical object of the present disclosure.

The method includes generating a trapping control signal for controlling movement of the biological tissue moving by a fluid, generating an acoustic field for controlling the movement of the biological tissue by outputting a first focused ultrasound based on the trapping control signal, and outputting a second focused ultrasound based on a destruction control signal generated to destroy the biological tissue whose movement is controlled by the acoustic field.

The generating of the trapping control signal may include: receiving a medical image including the biological tissue, and generating the destruction control signal for destroying the biological tissue according to characteristics and a size of the biological tissue.

In the generating of the trapping control signal, by generating the trapping control signal including a first pulse length, a first pulse repetition frequency, a first ultrasound output frequency, a second pulse length, a second pulse repetition frequency, and a second ultrasound output frequency, the movement of the biological tissue larger than a preset critical size or larger than the size of the biological tissue may be controlled.

The first focused ultrasound may be composed of a first focused ultrasound for control having the first pulse length and a first pulse repetition frequency and a second focused ultrasound for control having the second pulse length and a second pulse repetition frequency, phases of the first focused ultrasound for control and the second focused ultrasound for control may be reversed at a preset angle, and the acoustic field formed in the fluid using the first focused ultrasound for control and the second focused ultrasound for control may be formed into a plurality of lines by sequentially arranging antinodes and nodes.

An antinode-node spacing and radiation power generated by the antinode may be adjusted by adjusting the ultrasound output of the first pulse repetition frequency and the second pulse repetition frequency, and the first focused ultrasound for control and the second focused ultrasound for control may have an ultrasound center frequency of 0.1 MHz to 10 MHz, a pulse repetition frequency of 0.1 Hz to 100 Hz, a pulse length ranging from 0.1 ms to 1000 ms, a pulse repetition frequency ranging from 0.1 Hz to 500 Hz, and pressure intensity ranging from 0.01 MPa to 5 MPa.

In the outputting of the second focused ultrasound, the biological tissue whose movement is controlled by the acoustic field may be destroyed using acoustic cavitation generated in a blood vessel including the fluid through the second focused ultrasound.

The second focused ultrasound may have an ultrasound center frequency of 0.1 MHz to 10 MHz, a pulse length ranging from 0.1 ms to 100 ms, a pulse repetition frequency ranging from 0.1 Hz to 500 Hz, and a pressure of a maximum static pressure of 40 MPa or more and a maximum negative pressure of 10 MPa or less.

The method may further include: after the outputting of the second focused ultrasound, confirming whether the movement of the biological tissue is controlled based on an acoustic signal generated by the output of the first focused ultrasound, and confirming whether the biological tissue is destroyed based on the acoustic signal generated by the output of the second focused ultrasound.

The method may further include: after the outputting of the second focused ultrasound, generating another trapping control signal for controlling the movement of any one of the remaining biological tissues that pass through the acoustic field or the remaining biological tissues from which the biological tissue is destroyed, generating another acoustic field by outputting a third focused ultrasound based on the another trapping control signal, and outputting a fourth focused ultrasound based on another destruction control signal for destroying the remaining biological tissues whose movement is controlled by the another acoustic field.

The generating of the trapping control signal may further include generating the trapping control signal when a driving start signal of the apparatus for destroying biological tissue is generated or an ultrasound image including the biological tissue is input from a probe linked to the apparatus for destroying biological tissue.

According to another embodiment of the present disclosure, there is provided an apparatus for destroying biological tissue operated by at least one processor, which is another feature of the present disclosure for achieving the technical object of the present disclosure.

The apparatus includes a biological trapping unit generating a trapping control signal for controlling movement of the biological tissue moving by a fluid and generating an acoustic field for controlling the movement of the biological tissue by outputting a first focused ultrasound based on the trapping control signal, and a biological tissue destruction unit generating a destruction control signal for destroying the biological tissue whose movement is controlled based on the acoustic field and outputting a second focused ultrasound based on the destruction control signal for destroying the biological tissue whose movement is controlled by the acoustic field.

The biological tissue trapping unit may include: a trapping control unit generating a trapping control signal including a first pulse length, a first pulse repetition frequency, a first ultrasound output frequency, a second pulse length, a second pulse repetition frequency, and a second ultrasound output frequency, a first ultrasound output unit for trapping outputting first focused ultrasound for trapping based on the first pulse length and the first pulse repetition frequency, and a second ultrasound output unit for trapping outputting a second focused ultrasound for trapping based on the second pulse length and the second pulse repetition frequency.

A phase of the first focused ultrasound for trapping and a phase of the second focused ultrasound for trapping may be reversed by 180°, and the acoustic field formed in the fluid using the first focused ultrasound for trapping and the second focused ultrasound for control may be formed into a plurality of lines by sequentially arranging antinodes and nodes.

The first ultrasound output unit for trapping and the second ultrasound output unit for trapping may maintain an angular range of each ultrasound irradiation axis between 10° and 180°, and the first focused ultrasound for trapping and the second focused ultrasound for trapping may be arranged to face one focal area.

The first focused ultrasound for trapping and the second focused ultrasound for trapping may have an ultrasound center frequency of 0.1 MHz to 10 MHz, a pulse length ranging from 0.1 ms to 1000 ms, a pulse repetition frequency ranging from 0.1 Hz to 500 Hz, and pressure intensity ranging from 0.01 MPa to 5 MPa.

The biological tissue destruction unit may include: a destruction control unit generating the destruction control signal for destroying the target biological tissue according to characteristics and size of the target biological tissue, and an ultrasound output unit outputting a second focused ultrasound based on the destruction control signal for destroying the biological tissue whose movement is controlled by the acoustic field.

The destruction control unit may generate the destruction control signal for destroying a target biological tissue using a first method when a size of a blood vessel diameter through which the fluid flows is larger than a preset size and generate the destruction control signal for destroying the target biological tissue using a second method when the size of the blood vessel diameter is smaller than the preset size, and the first method and the second method may each be any one of boiling histotripsy or variable pressure shock wave histotripsy.

The apparatus may further include: a signal analysis unit including passive acoustic emission detection (PAED) that confirms whether the movement of the biological tissue is controlled based on an acoustic signal generated by the output of the first focused ultrasound, and whether the biological tissue is destroyed based on the acoustic signal generated by the output of the second focused ultrasound.

According to an embodiment of the present disclosure, by controlling the movement of the biological tissue that is fixed to the wall of the blood vessel or moves along the bloodstream and applying the ultrasound energy to the biological tissue whose movement is controlled to destroy the biological tissue it is possible to significantly reduce the possibility of side effects such as inflammation, swelling, and bleeding.

In addition, since the ultrasound output conditions of the acoustic trapping and destroying device can be controlled according to the characteristics of blood vessels in various areas and the characteristics of the thrombus or embolism, it can be applied to blood vessels having various structures in which lesions such as the thrombus or embolism may occur.

In addition, since it takes a very short time to destroy the trapped lesion, it is possible to reduce patients' fatigue caused by treatment and procedures.

In addition, by using the acoustic trapping and monitoring, it can be used as an assistive device for thrombectomy procedures in clinical practice and as a device for early diagnosis and prevention of embolization-induced conditions in daily life.

DETAILED DESCRIPTION OF THE EMBODIMENTS

Figure 1:
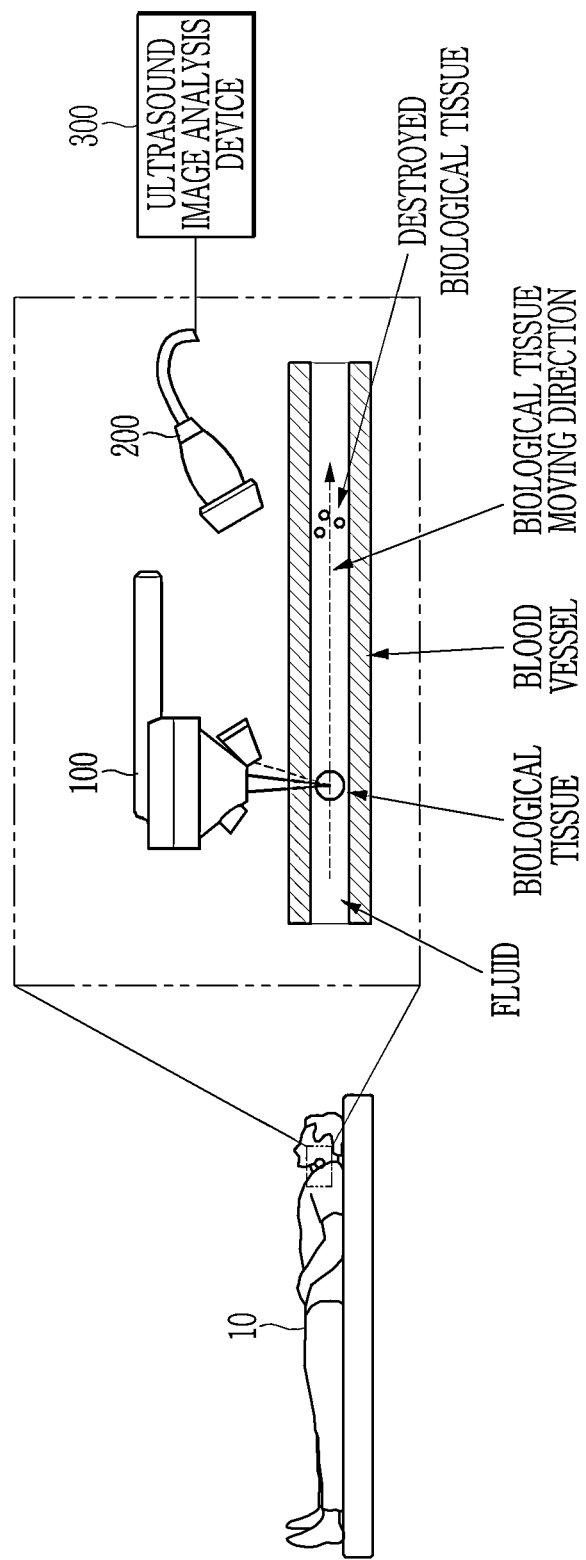
FIG. 1 is an exemplary diagram of an environment in which an apparatus for destroying biological tissue according to an embodiment of the present disclosure is implemented.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

Hereinafter, an apparatus for destroying biological tissue and a method for trapping biological tissue in fluids flow using the same according to an embodiment of the present disclosure will be described with reference to the drawings.

FIG. 1 is an exemplary diagram of an environment in which an apparatus for destroying biological tissue according to an embodiment of the present disclosure is implemented.

Recently, ultrasound stimulation therapy, which may stimulate an affected area without a physically invasive process, has been widely used. Ultrasound can be divided into high-intensity focused ultrasound (HIFU) and low-intensity focused ultrasound (LIFU) depending on its intensity. The high-intensity focused ultrasound is used for direct treatment, such as removing biological tissues such as cancer cells, tumors, and lesions, while low-intensity focused ultrasound is known to achieve medical effects without damaging body tissues.

The unit determining the ultrasound intensity may be expressed as spatial-peak temporal-average intensity (Ispta) and spatial-peak pulse average intensity (Isppa).

In particular, a high-intensity focused ultrasound has the spatial-peak temporal-average intensity of 3 W/cm² or more. Therefore, by using the high-intensity focused ultrasound, it is possible to deliver powerful acoustic energy tens to hundreds of times an atmospheric pressure to a desired area in a body completely non-invasively. Acoustic energy transmitted into the body may be converted into thermal energy or mechanical energy to directly remove the biological tissue.

The high-intensity focused ultrasound based on the thermal energy collects the ultrasound energy of a certain acoustic intensity or more in one point and generates high heat at a focus, leading to thermal necrosis of tissue. This method is currently widely used clinically for treatment of diseases such as uterine fibroids, uterine adenomas, uterine fibroids, benign prostatic hypertrophy, prostate cancer, metastatic bone tumors, and tremor.

Recently, in addition to a thermal ablation effect using heat energy, technologies for physically removing soft tissue using focused ultrasound are being studied. This technology, called 'technology of removing focused ultrasound soft tissue' or 'boiling histotripsy', is a technology of using pressure tens of times more powerful than an acoustic pressure used in the existing high-intensity focused ultrasound to artificially generate acoustic cavitation at an ultrasound focus, thereby physically removing surrounding tissues.

The boiling histotripsy technology may have a shorter treatment time compared to the existing high-intensity focused ultrasound treatment and monitor the treatment process through the physical removal of tissue and real-time cavitation monitoring, attracting attention as a promising next-generation ultrasound surgical technology in clinical practice.

As illustrated in FIG. 1, an apparatus 100 for destroying biological tissue controls movement of a thrombus or embolism (hereinafter, for convenience of description, referred to as 'living tissue') that moves according to fluids (e.g., blood) flowing within a blood vessel of a patient 10 and destroys the biological tissue whose movement is controlled.

In an embodiment of the present disclosure, the apparatus 100 for destroying biological tissue is described as an example of implementing in a handheld form in which a worker (e.g., a doctor, etc.) may hold and use the apparatus 100 for destroying biological tissue in his/her hand, but is not necessarily limited thereto. In addition, for convenience of description, the embodiment of the present disclosure describes an example of controlling the movement of the biological tissue moving through blood and destroying the biological tissue, but may be used in the field of controlling movement of impurities mixed in various fluids and destroying the impurities.

The apparatus 100 for destroying biological tissue forms an acoustic field in the fluid using focused ultrasound of first strength for biological tissue moving according to the fluid flow. The acoustic field formed is formed by a plurality of lines composed of antinodes and nodes.

By catching the biological tissue larger than the antinode-node spacing of the acoustic field formed by the apparatus 100 for destroying biological tissue in the acoustic field to prevent the biological tissue from moving in another direction according to the fluid flow, the apparatus 100 for destroying biological tissue may control the movement of the biological tissue. In addition, the apparatus 100 for destroying biological tissue may control the movement of the biological tissue by a radiation force generated by the antinode of the acoustic field. Hereinafter, for convenience of description, in the embodiment of the present disclosure, controlling the movement of the biological tissue will be described using the expression trapping the biological tissue.

Further, the apparatus 100 for destroying biological tissue destroys the biological tissue by outputting the focused ultrasound of the second intensity stronger than the first intensity, to the biological tissue whose movement is controlled by being caught in the acoustic field. The apparatus 100 for destroying biological tissue may destroy the biological tissue using either boiling histotripsy or variable pressure shock wave histotripsy depending on a size of a blood vessel diameter.

In other words, the apparatus 100 for destroying biological tissue may destroy biological tissue through boiling histotripsy when the blood vessel diameter is greater than a preset threshold. When the blood vessel diameter is smaller than the threshold, the apparatus 100 for destroying biological tissue may destroy the biological tissue through variable pressure shock wave histotripsy that controls the destroying range and intensity of the biological tissue.

In addition, after destroying the biological tissue using the apparatus 100 for destroying biological tissue, a worker collects ultrasound images around the location where the biological tissue is destroyed using a probe 200. The ultrasound image collected by the probe 200 is transmitted to an ultrasound image analysis device 300 to determine the degree of destruction of the biological tissue, the size of the biological tissue after the destruction, etc.

Based on the information analyzed by the ultrasound image analysis device 300, the apparatus 100 for destroying biological tissue may once again destroy small-sized biological tissue that has escaped the acoustic field or destroyed remaining biological tissues that are smaller than the antinode-node spacing. In an embodiment of the present disclosure, destroying the biological tissue twice is used as an example, but it is not necessarily limited thereto.

In addition, the ultrasound image analysis device 300 receives an ultrasound image analysis echo signal reflected from the probe in contact with the blood vessel wake. In addition, the ultrasound image analysis device 300 may generate the ultrasound image within the blood vessel based on the received ultrasound image analysis echo signal and display the generated ultrasound image.

The ultrasound image analysis device 300 may generate a brightness mode (B-mode) image in which the intensity of the echo signal reflected from biological tissue is expressed as brightness, or display the generated image so that the worker may confirm whether the biological tissue is destroyed and whether the movement of the biological tissue is controlled.

The structure of the apparatus 100 for destroying biological tissue, which controls the movement of the biological tissue and destroys the biological tissue in the above-described environment, will be described with reference to FIG. 2.

Figure 2:
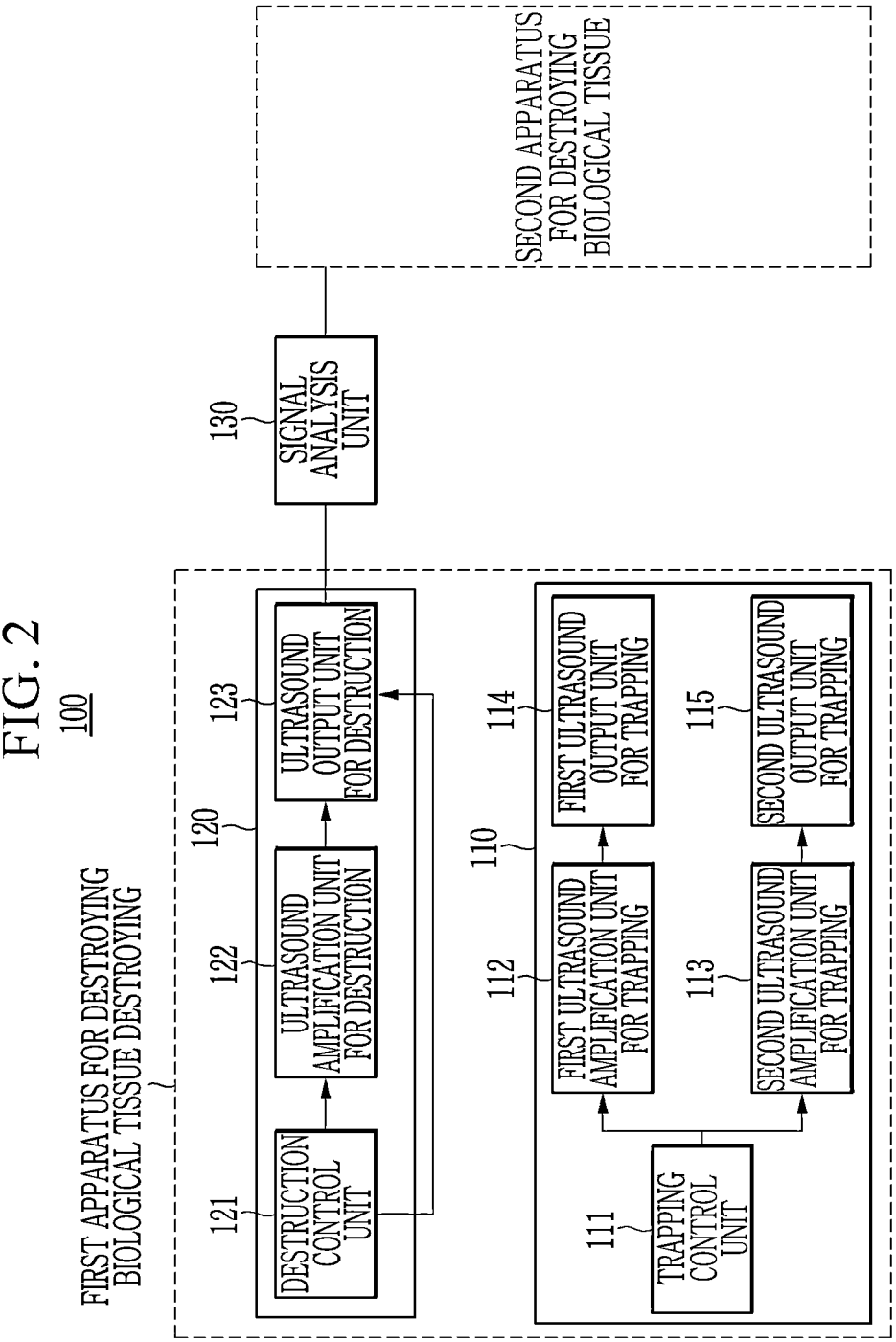
FIG. 2 is a structural diagram of the apparatus for destroying biological tissue according to the embodiment of the present disclosure.

FIG. 2 is a structural diagram of the apparatus for destroying biological tissue according to the embodiment of the present disclosure.

As illustrated in FIG. 2, the apparatus 100 for destroying biological tissue includes a biological tissue trapping unit 110 and a biological tissue destruction unit 120. In addition, the apparatus 100 for destroying biological tissue may further include a signal analysis unit 130.

FIG. 2 illustrates only the components necessary for describing the embodiment of the present disclosure, and does not illustrate all the components necessary to operate the apparatus 100 for destroying biological tissue or obtain the effect of the disclosure. That is, in addition to the above components, additional hardware and/or software components may be included to achieve the effect of the disclosure.

The biological tissue trapping unit 110, which controls the movement of ultrasounds by outputting focused ultrasounds, includes a trapping control unit 111, a first ultrasound amplification unit for trapping 112, a second ultrasound amplification unit for trapping 113, a first ultrasound output unit for trapping 114 and a second ultrasound output unit for trapping 115.

The biological tissue destruction unit 120, which outputs focused ultrasound to destroy the biological tissue, includes a destruction control unit 121, an ultrasound amplification unit for destruction 122, and an ultrasound output unit for destruction 123.

The biological tissue trapping unit 110 generates the acoustic field within the blood vessel to fix the movement of the biological tissue.

The acoustic field generated within the blood vessel is formed by a plurality of lines that include an antinode, which is a part with the largest amplitude in a standing wave, and a node, which is a part having the shortest amplitude in the standing wave. Since the antinode-node spacing of the acoustic field is determined by frequency characteristics of the ultrasound transducer, the higher the frequency, the narrower the spacing is generated. The biological tissue trapping unit 110 may trap the biological tissue not only through the antinode-node spacing but also through the radiation force generated by the antinode.

In the acoustic field, the antinode-node spacing, that is, a net spacing, is a major factor that determines the size through which the biological tissue may pass. Therefore, the movement of the biological tissue larger than the preset size (hereinafter, for convenience of description, referred to as 'critical size') is prevented, and the movement of the biological tissue smaller than the critical size is allowed to pass.

The embodiment of the present disclosure will describe, as an example, that the biological tissue trapping unit 110 generates the sound field based on a 1 MHz focused ultrasound transducer to prevent biological tissues with a size of 1 mm or more from moving and to allow biological tissues with a size smaller than 1 mm to pass through. However, the critical size is not necessarily limited thereto, and the biological tissue trapping unit 110 may configure the size of the biological tissue in the medical image and generate the acoustic field depending on the size of the confirmed biological tissue.

Therefore, the trapping control unit 111 included in the biological tissue trapping unit 110 generates the trapping control signal that controls the antinode-node spacing of the acoustic field and the intensity of the radiation force generated by the antinode depending on the frequency characteristics ranging from 0.1 MHz to 50 MHz of the ultrasound output from the first ultrasound output unit for trapping 114 and the second ultrasound output unit for trapping 115.

The trapping control signal includes a first pulse length to be applied to the first ultrasound output unit for trapping 114, a first pulse repetition frequency and a first ultrasound output frequency, a pulse length to be applied to the second ultrasound output unit for trapping 115, and a second pulse repetition frequency and a second ultrasound output frequency. In addition, the trapping control signal includes information determining the characteristics of the focused ultrasound such as a first acoustic pressure, a first intensity, a focused ultrasound irradiation time, and a waveform to be commonly applied to the first ultrasound output unit for trapping 114 and the second ultrasound output unit for trapping 115.

Here, the first acoustic pressure and first intensity included in the trapping control signal have the lower intensity and lower pressure than a second acoustic pressure and second intensity included in the destruction control signal, which will be described later.

The antinode-node spacing of the acoustic field generated by the focused ultrasound output from the ultrasound output unit for trapping varies depending on the first acoustic pressure and the first intensity. Therefore, the description will be made by taking as an example that the trapping control unit 111 has been pre-trained with training data including the antinode-node spacing of the acoustic field and the acoustic pressure and intensity.

Here, the antinode-node spacing of the acoustic field is determined according to the ultrasound output frequency output from the first ultrasound output unit for trapping 114 and the second ultrasound output unit for trapping 115. The intensity of the radiation force generated by the antinode is proportional to a first acoustic pressure included in the trapping control signal. The narrower the antinode-node spacing, the smaller the biological tissue can be trapped, and as the radiation force increases, the biological tissue may be trapped at a rapid flow rate.

In addition, in the embodiment of the present disclosure, the first ultrasound output unit for trapping 114 and the second ultrasound output unit for trapping 115 are described as an example of outputting the focused ultrasound having the same intensity, but this is not necessarily limited thereto.

However, the first ultrasound output unit for trapping 114 and the second ultrasound output unit for trapping 115 should have a certain angle difference in the phases of the focused ultrasounds they each output and have the same acoustic pressure, which should be generated at location where the acoustic field is focused. In an embodiment of the present disclosure, the phase difference of focused ultrasound is not limited to any one angle, and 180° is used as an example for description.

When the acoustic pressures of the focused ultrasound output from the first ultrasound output unit for trapping 114 and the second ultrasound output unit for trapping 115 are different from each other, the acoustic pressure values of both antinodes centered on the node in the area where the ultrasound is focused varies. Therefore, the biological tissue to be trapped may move to the side with less radiation force, that is, the side with less acoustic pressure, making the trapping impossible. In this case, the acoustic pressure value applied to the first ultrasound output unit for trapping 114 and the second ultrasound output unit for trapping 115 may be set differently depending on the characteristics of the biological tissue, that is, the location or physical properties of the biological tissue.

In addition, since the embodiment of the present disclosure is described as an example that two ultrasound output units for trapping are provided as a pair, it will be described as an example that two pulse lengths and two pulse repetition frequencies are set. Accordingly, the trapping control unit 111 sets the overlapping waveforms of the ultrasounds output from each ultrasound output unit for trapping 114 and 115 become standing waves and the phases of the waveforms of each ultrasound are set to be different 180°.

An ultrasound transducer is a sound source that outputs ultrasounds and may output high-intensity ultrasounds of 3 W/cm$^2$ or more. In an embodiment of the present disclosure, the ultrasound output unit for trapping may be configured as a single transducer, or as illustrated in FIG. 2, a plurality of transducers may be configured as a transducer array that focuses ultrasounds at a single focus.

The first ultrasound output unit for trapping 114 and second ultrasound output unit for trapping 115 composed of the transducer array may each be arranged so that the first ultrasound output unit for trapping 114 and second ultrasound output unit for trapping 115 makes the focuses of the focused ultrasounds overlap at or approach a point that is part of the biological tissue.

The embodiment of the present disclosure will be described as an example that the angle between the first ultrasound output unit for trapping 114 and the second ultrasound output unit for trapping 115 is arranged within an angle range of 10° to 180° so that the focused ultrasound output from the first ultrasound output unit for trapping 114 and the second ultrasound output unit for trapping 115 are directed to one focal area.

That is, the position, distance, and angle of the biological tissue trapping unit 110 are set according to the location of the blood vessel to which the trapping technology is to be applied. The embodiment of the present disclosure will be described as an example that the angle and distance of the first ultrasound output unit 114 and the second ultrasound output unit for trapping 115 included in the biological tissue trapping unit 110 based on the time when the acoustic pressure of the acoustic field at the ultrasound focus is the highest are set.

The structure of the ultrasound output units for trapping 114 and 115 is only an example and is not limited to a specific structure, angle, or effect. A piezoelectric element of the transducer may output ultrasound of appropriate intensity by adjusting the output according to the area to be treated and purpose, and the output ultrasounds overlap to form an ultrasound beam.

The first ultrasound output unit for trapping 114 is linked to the first ultrasound amplification unit for trapping 112, and the second ultrasound output unit for trapping 115 is linked to the second ultrasound amplification unit for trapping 113. The first ultrasound amplification unit for trapping 112 and the second ultrasound amplification unit for trapping 113 each amplify the focused ultrasounds based on the trapping control signal, and output the amplified focused ultrasounds through the first ultrasound output unit for trapping 114 and the second ultrasound output unit for trapping 115.

That is, the first ultrasound amplification unit for trapping 112 and the second ultrasound amplification unit for trapping 113 each amplify the focused ultrasounds so that the first ultrasound output unit for trapping 114 and the second ultrasound output unit for trapping 115 output the focused ultrasounds that a pulse length ranging from 0.1 ms to 1000 ms, a pulse repetition frequency ranging from 0.1 Hz to 500 Hz, an ultrasound frequency ranging from 0.1 MHz to 50 MHz, a pressure intensity of 0.01 MPa to 5 MPa, and a phase ranging from 1° to 180°.

Meanwhile, when the information on the biological tissue for destroying is input from the outside, the destruction control unit 121 controls the ultrasound output unit for destruction 123 to generate the destruction control signal to output the focused ultrasound. In this case, the destruction control signal includes information that determines the characteristics of ultrasounds, such as second acoustic pressure, second intensity, waveform, frequency, and variable acoustic pressure application time.

In addition, the destruction control signal may include information on a method for destroying biological tissue using a method of destroying biological tissue according to the diameter of the blood vessel, that is, a first method when the blood vessel diameter is larger than the preset reference size and a second method when the blood vessel diameter is smaller than the reference size. Here, the first method describes the boiling histotripsy as an example and the second method describes a variable pressure shock wave histotripsy as an example, but the present disclosure is not necessarily limited thereto.

Specifically, the destruction control unit 121 calculates the variable acoustic pressure application time when the pressure and intensity of the focused ultrasound is lowered to a level that does not generate shock waves when the size of the blood vessel diameter is smaller than the reference size based on the information on the biological tissue for destruction that is input from the outside. The destruction control unit 121 controls the intensity of the focused ultrasound to be the set value or lower by adjusting parameters such as the acoustic pressure, the focused ultrasound pressure, and the irradiation time of the ultrasounds output from the ultrasound transducer through the ultrasound wave output unit for destruction 123.

Here, the set value refers to the maximum value of intensity that prevents the focused ultrasound from generating the shock wave scattering effects within biological tissue. For example, at a preset point while outputting a high-intensity focused ultrasound waveform with a shock wave pressure of 40 MPa or more at the focus or a nonlinear ultrasound waveform with a maximum static pressure of 30 MPa or more and a maximum negative acoustic pressure of −10 MPa or less, the ultrasound output unit for destruction 123 adjusts the acoustic pressure of the focused ultrasound so that the acoustic pressure is either a linear or non-linear ultrasound waveform with a maximum static pressure of less than 40 MPa, or a maximum static pressure of 30 MPa or less and a maximum negative pressure of −10 MPa or more, thereby preventing the shock wave scattering effects and the resulting bubble clouds from occurring.

In addition, the control unit sets the pulse time to be from a minimum of 0.1 ms to a maximum of 100 ms, the ultrasound center frequency to be in the range of 0.1 MHz to 10 MHz, the pulse repetition frequency to be in the range of 0.1 Hz to 100 Hz, and the duty cycle to be in the range of 0.1% to 10%. In this case, the number of pulses is set to 1 or more.

In addition, the destruction control unit 121 sets the control signal to destroy the biological tissue using the boiling histotripsy when the size of the blood vessel diameter is larger than the reference size, based on the information on the biological tissue for destruction input from the outside.

The ultrasound amplification unit for destruction 122 receives the destruction control signal from the destruction control unit 121 and amplifies the ultrasounds up to the second pressure and second intensity of the focused ultrasound included in the destruction control signal. The method for amplifying, by the ultrasound amplification unit for destruction 122, the pressure and intensity of the focused ultrasound is an already known technology, and therefore, the embodiment of the present disclosure is not limited to any one method.

The ultrasound output unit for destruction 123 outputs the high-intensity focused ultrasounds amplified by the ultrasound amplification unit for destruction 122 to the biological tissue to be removed. The ultrasound output unit for destruction 123 includes an ultrasound transducer capable of outputting the high-intensity focused ultrasound. The ultrasound transducer, which is the ultrasound output unit for destruction 123, is a sound source that outputs the ultrasound, and it will be described as an example that the ultrasound transducer outputs the high-intensity ultrasound of 3 W/cm$^2$ or more, but is not necessarily limited thereto.

It will be described as an example that the ultrasound output unit 121 for destroying in the embodiment of the present disclosure is composed of a single transducer. However, the plurality of transducers may be composed of a transducer array that focuses ultrasounds at one focus, and is not limited to any one form.

In this case, the ultrasound output unit 121 for destruction irradiates the high-intensity focused ultrasound so that the high-intensity focused ultrasound beam is focused on a point, that is, the focus, of the biological tissue to be removed. The vibration energy is focused in one place by the high-intensity focused ultrasound irradiated to the focus to generate powerful nonlinear shock waves. The vapor bubbles of several hundred μm to several mm in size are generated at the focus by the thermal effect of the shock wave (acoustic cavitation phenomenon), and the biological tissue may be removed using the shock generated when these bubbles vibrate and collapse/disappear (mechanical ablation).

Alternatively, the high-intensity focused ultrasound output by a destruction ultrasound output unit 121 may have a linear or non-linear waveform with a high frequency so as to instantly increase the temperature, although the pressure is not high enough to generate the shock wave. Even in this case, as in the case where the shock wave is generated, the vapor bubbles may be generated within the biological tissue due to the boiling effect to destroy the biological tissue.

The signal analysis unit 130 included in the apparatus 100 for destroying biological tissue may analyze the shock wave signal generated from the cavitations of the first focused ultrasound output from the biological tissue trapping unit 110 and the second focused ultrasound output from the biological tissue destruction unit 120.

That is, the signal analysis unit 130 may include passive acoustic emission detection (PAED) that may analyze the cavitation signals of the first focused ultrasound and the second focused ultrasound, and determines at least one of whether the position of the biological tissue is fixed by the biological tissue trapping unit 110 and whether the acoustic cavitation is generated within the blood vessel.

The PAED may be equipped with a signal detection sensor to detect the change in acoustic or electrical signals in order to confirm at least one of whether the position of the biological tissue is fixed and whether the acoustic cavitation is generated within the blood vessel. When the focused ultrasound is output to the biological tissue, the vapor bubbles are generated within the biological tissue by the shock wave, and the acoustic signal or electric signal is generated accordingly.

According to an embodiment of the present disclosure, it can be seen that the PAED includes a signal detection sensor to detect the acoustic signal or electric signal generated from the biological tissue, and thus, when a signal of a specific waveform is detected, vapor bubbles have been generated.

In the embodiment of the present disclosure, it is described as an example that the PAED is performed using the acoustic transducer located at the center of the ultrasound output unit for destruction 123. In the acoustic signal coming from the pair of the first ultrasound output unit for trapping 114 and the second ultrasound output unit for trapping 115 used for the acoustic trapping purposes, when the movement of the biological tissue is controlled, the peak voltage of the PAED may appear small due to the acoustic attenuation effect caused by the biological tissue. The signal analysis unit 130 may perform the spectrogram analysis of a PAED voltage signal to confirm whether the movement of biological tissue is controlled.

Here, the first ultrasound output unit for trapping 114 and the second ultrasound output unit for trapping 115 each generate a potential null where the pressure of the focused ultrasound focus is 0 and generate an acoustic field in the form that the antinodes are present on both sides thereof. The biological tissue may be trapped through the generated acoustic field. The method for generating, by the first ultrasound output unit for trapping 114 and the second ultrasound output unit for trapping 115, the acoustic field is an already known technology, and therefore, the detailed description in the embodiments of the present disclosure is not limited to any one method.

In another embodiment, when the PAED signal is confirmed when the biological tissue is destroyed by the boiling histotripsy based on the ultrasound output unit for destruction 123, the signal analysis unit 130 may simultaneously measure the cavitation signal and the acoustic signal by controlling the movement of the biological tissue.

The signal analysis unit 130 may perform a spectrogram analysis of the PAED voltage signal measured at this time to confirm the signal by the biological tissue trapping unit 110, the cavitation broadband signal by the boiling histotripsy, and the harmonics signal of a multiple of 2 MHz from the overlapping signal waveform. Therefore, the signal analysis unit 130 measures and analyzes the signal to observe in real time whether the movement of the biological signal is controlled by the biological tissue trapping unit 110 and whether the cavitation is generated by the biological tissue destruction unit 120.

In FIG. 2 described above, one biological tissue trapping unit 110 and a biological tissue destruction unit 120 are illustrated. However, another biological tissue trapping unit and a biological tissue destruction unit may additionally be provided to destroy the small-sized biological tissue that has escaped the acoustic field or the small-sized biological tissue generated by being destroyed by the biological tissue destruction unit 120.

In other words, another apparatus for destroying biological tissue (corresponding to the 'second apparatus for destroying biological tissue' illustrated in FIG. 2) destroys biological tissue with a size that may potentially cause embolization, such as the small-sized biological tissue that has escaped the acoustic field or a small-sized biological tissue generated by being destroyed by the biological tissue destruction unit 120. The structure of the second apparatus for destroying biological tissue is the same as that of the apparatus for destroying biological tissue described above, but it will be described as an example that the signal analysis unit uses the signal analysis unit 130 described above to determine whether the biological tissue is destroyed.

Next, the operation flow for controlling and destroying biological tissue using the apparatus 100 for destroying biological tissue will be described with reference to FIG. 3. In an embodiment of the present disclosure, it will be described as an example that when the medical image is input, the size or type of biological tissue included in the medical image is identified and a control signal is generated to control the movement of the biological tissue. However, in order to control the movement of the biological tissue that can potentially occur, the first trapping control signal may be generated at a preset size.

Figure 3:
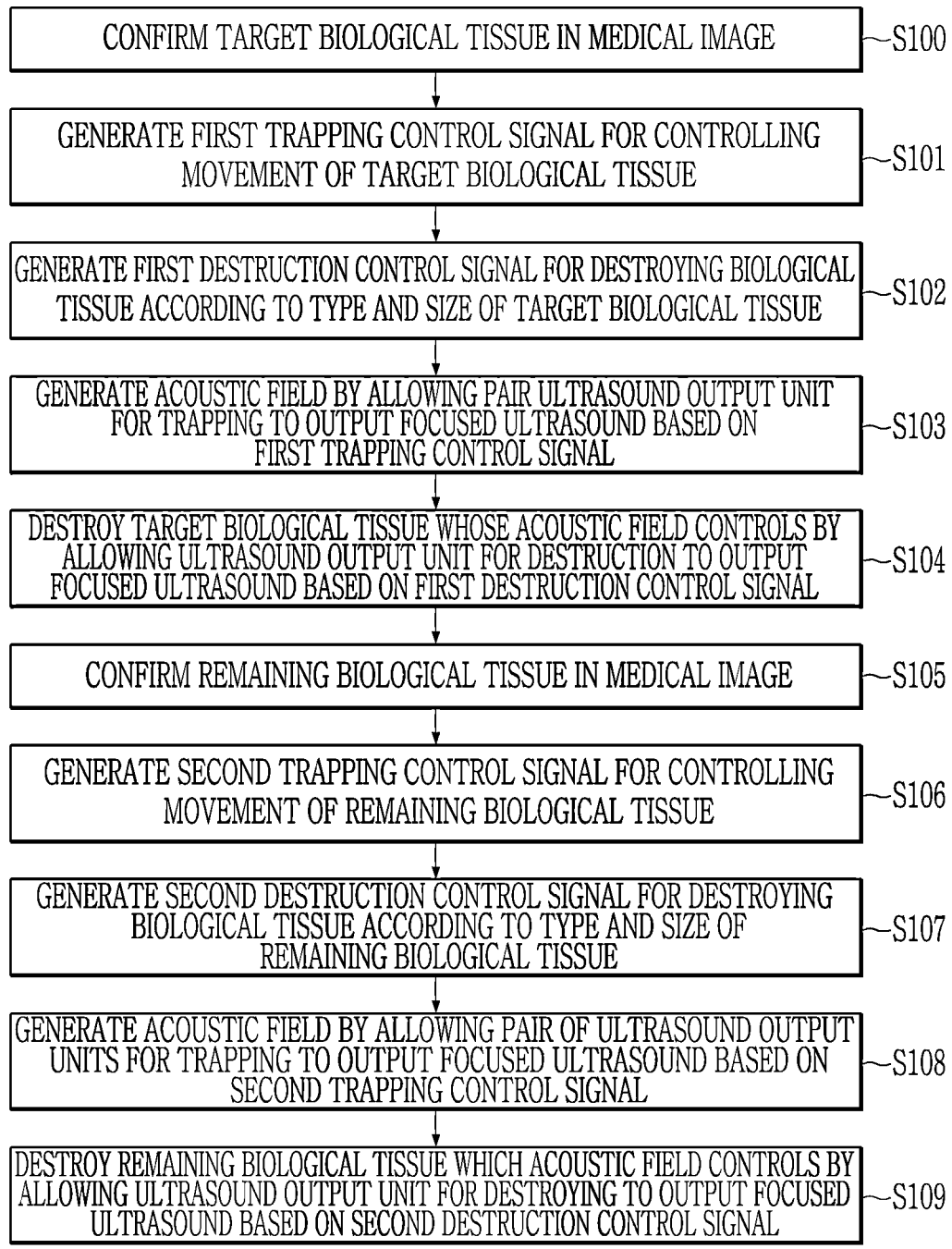
FIG. 3 is a flowchart of an operation of the apparatus for destroying biological tissue according to the embodiment of the present disclosure.

FIG. 3 is a flowchart of an operation of the apparatus for destroying biological tissue according to the embodiment of the present disclosure.

As illustrated in FIG. 3, when the medical image is input to the apparatus 100 for destroying biological tissue, the apparatus 100 for destroying biological tissue confirms the biological tissue to be destroyed (hereinafter referred to as 'target biological tissue') from the input medical image (S100). In an embodiment of the present disclosure, it will be described as an example that when the medical image is input to the apparatus 100 for destroying biological tissue, the target biological tissue is confirmed.

However, when a worker turns on a power supply (not illustrated) of the apparatus 100 for destroying biological tissue to drive the apparatus 100 for destroying biological tissue in the state where the medical images are not input to the apparatus 100 for destroying biological tissue, preparations to control movement of potential biological tissue may be made based on a driving start signal.

In this case, the apparatus 100 for destroying biological tissue determines the position or size of the biological tissue in the ultrasound image that the worker collects using the probe 200 and prepares to control the movement of the target biological tissue based on the determined position or size. Since the method for determining, by the apparatus 100 for destroying biological tissue, the position or size of the biological tissue from the ultrasound image collected by the probe 200 may be executed as various methods, the embodiments of the present disclosure are not limited to any one method.

The apparatus 100 for destroying biological tissue generates the first trapping control signal to control the movement of the target biological tissue configured in the medical image along the blood (S101). In this case, it will be described as an example that the apparatus 100 for destroying biological tissue uses an example of generating the first trapping control signal that includes the first pulse length, the first pulse repetition frequency, the second pulse length, and the second pulse repetition frequency to control the movement of the target biological tissue whose size is larger than the critical size (e.g., 1 mm or more).

However, the apparatus 100 for destroying biological tissue may determine the size of the target biological tissue, and generate the first trapping control signal that includes the first pulse length, the first pulse repetition frequency, the second pulse length, and the second pulse repetition frequency to control the movement of the target biological tissue.

Here, the first pulse length, the second pulse length, the first pulse repetition frequency, and second pulse repetition frequency generated by the apparatus 100 for destroying biological tissue may be the same or different. However, it will be described as an example that the apparatus 100 for destroying biological tissue generates the first trapping control signal so that the first pulse length and the second pulse length have a pulse length ranging from 0.1 ms to 1000 ms, and the first pulse repetition frequency and the second pulse repetition frequency have the pulse repetition frequency ranging from 0.1 Hz to 500 Hz.

Meanwhile, the apparatus 100 for destroying biological tissue generates the first destruction control signal for destroying the biological tissue according to the type and size of the target biological tissue (S102). In other words, the apparatus 100 for destroying biological tissue generates the first destruction control signal that includes the pressure and number of pulses of the focused ultrasound to destroy the target biological tissue when the medical image of the target biological tissue to be destroyed, the type of target biological tissues, the location and size of the biological tissues, and the information on the range to be destroyed are input.

The apparatus 100 for destroying biological tissue controls a pair of ultrasound output units for trapping 114 and 115 to output the focused ultrasounds, respectively, based on the first trapping control signal generated in step S101. Through this, the acoustic field is generated within the fluid, that is, blood, and controls the flow of target biological tissue larger than the critical size to flow into another location by the antinode-node spacing and radiation force of the acoustic field (S103).

The apparatus 100 for destroying biological tissue controls the ultrasound output unit for destruction 123 based on the first destruction control signal generated in step S102, and the ultrasound output unit for destruction 123 outputs the focused ultrasound wave based on the first destruction control signal. The target biological tissue is destroyed according to the focused ultrasounds output from the ultrasound output unit for destruction 123 (S104).

In this case, the apparatus 100 for destroying biological tissue may destroy the biological tissue that has escaped the acoustic field generated in step S103 or the remaining biological tissues that are destroyed in step S104 (hereinafter, for convenience of description, referred to as 'remaining biological tissue') once more.

For this purpose, the apparatus 100 for destroying biological tissue confirms the remaining biological tissues in the medical image in which the remaining biological tissues are captured (S105). Through this, the apparatus 100 for destroying biological tissue may determine the size and position of the remaining biological tissue.

In order to control the movement of the remaining biological tissue, the apparatus 100 for destroying biological tissue generates the second trapping control signal so that the antinode-node of the acoustic field is formed smaller than the size of the remaining biological tissue (S106).

In addition, the apparatus 100 for destroying biological tissue generates the second destruction control signal to destroy the remaining biological tissue according to the type and size of remaining biological tissue (S107). The method for generating, by the apparatus 100 for destroying biological tissue, the second destruction control signal according to the type and size of the remaining biological tissue is the same as the above-described step S102.

The apparatus 100 for destroying biological tissue generates the acoustic field based on the second trapping control signal generated in step S106 (S108). In addition, based on the second destruction control signal generated in step S107, the focused ultrasounds for destruction are output to destroy the remaining biological tissue controlled by the acoustic field (S109).

Next, the embodiment of the apparatus 100 for destroying biological tissue that performs the above-described functions will be described with reference to FIG. 4.

FIG. 4 is an exemplary diagram of the apparatus for destroying biological tissue according to the embodiment of the present disclosure.

Figure 4A:
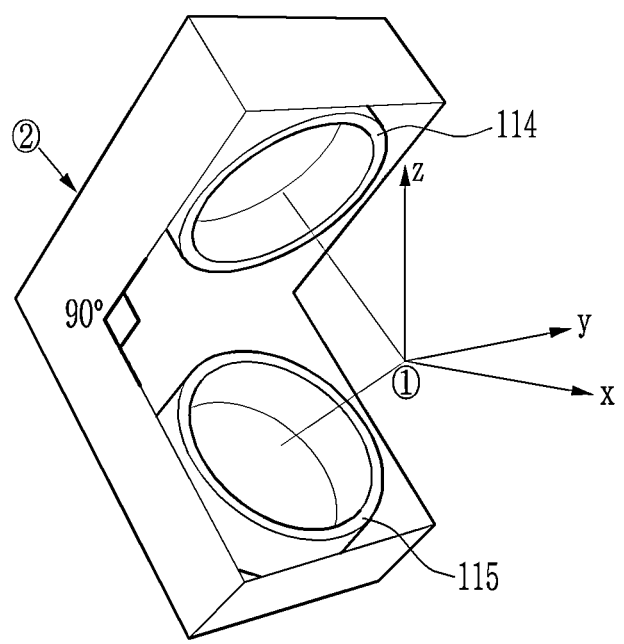
FIGS. 4A and 4B are exemplary diagrams of the apparatus for destroying biological tissue according to the embodiment of the present disclosure.
Figure 4B:
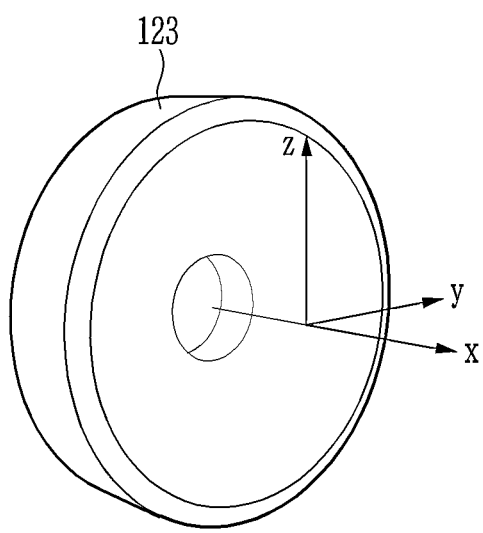

FIG. 4A is an exemplary implementation diagram of the biological tissue trapping unit 110. FIG. 4B is an exemplary implementation diagram of the biological tissue destruction unit 120.

First, as illustrated in FIG. 4A, the focuses of the ultrasounds output from the transducers corresponding to the first ultrasound output unit for trapping 114 and the second ultrasound output unit for trapping 115 are installed to overlap at an angle of 90° from one focus ①. In order to align the first ultrasound output unit for trapping 114 and the second ultrasound output unit for trapping 115, the embodiment of the present disclosure will be described by using an acrylic holder ②; as an example. In this case, the shape or material of the acrylic holder (②) is not limited to any one shape or material.

As illustrated in FIG. 4B, it will be described as an example that the biological tissue destruction unit 120 is implemented in the form in which the center is opened to output the ultrasound for destroying the biological tissue.

Next, the process by which the apparatus 100 for destroying biological tissue controls the movement of the biological tissue and its temperature change will be described with reference to FIG. 5.

Figure 5A:
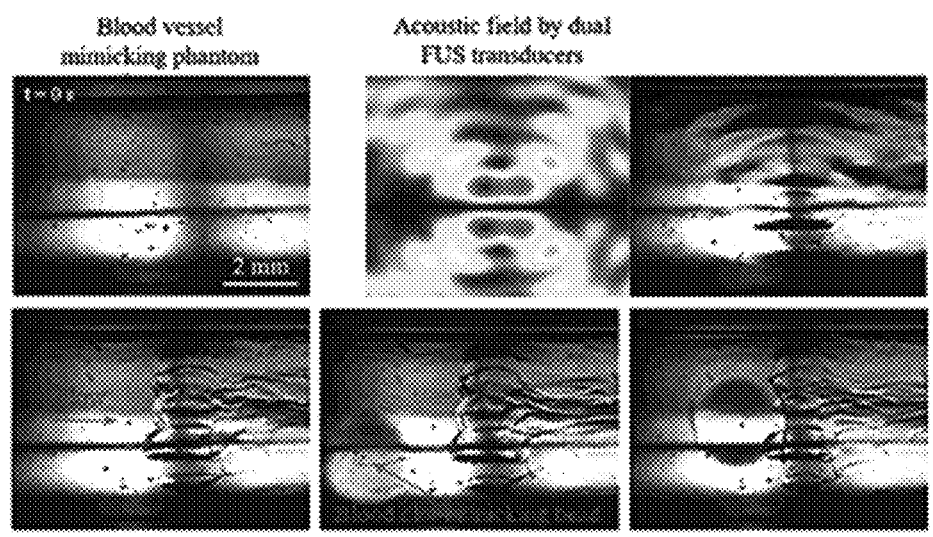
FIGS. 5A and 5B are exemplary diagrams illustrating movement of biological tissue controlled according to an embodiment of the present disclosure and a temperature change accordingly.
Figure 5B:
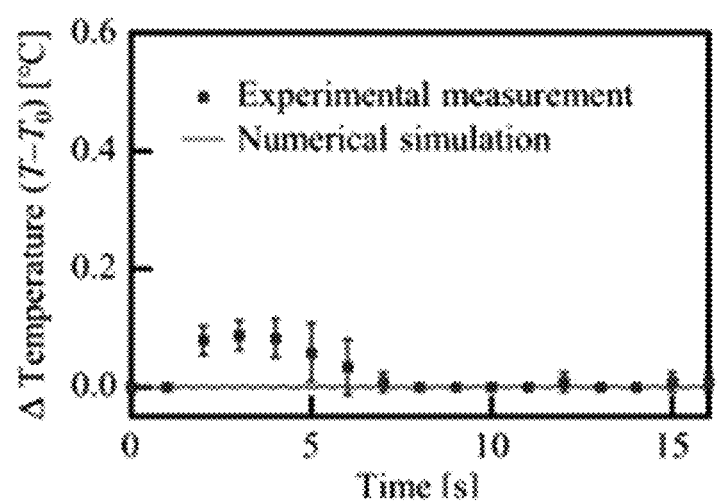

FIGS. 5A and 5B are exemplary diagrams illustrating the movement of biological tissue controlled according to the embodiment of the present disclosure and the temperature change accordingly.

FIG. 5A illustrates the process of controlling the movement of biological tissue. FIG. 5B is an exemplary diagram illustrating the temperature change.

First, as illustrated in FIG. 5A, two first ultrasound output unit for trappings 114 and a second ultrasound output unit for trapping 115 in the 1 MHz frequency band are arranged at a 90° angle based on the axial direction of the first ultrasound output unit for trapping 114 and the second ultrasound output unit for trapping 115, respectively, and the acoustic field is generated by overlapping a focus F position with the inside of the blood vessel simulating phantom.

When a pulse sound wave with a pulse length of 1 ms and a pulse repetition frequency of 500 Hz is given as an output condition from the trapping control unit 111 to the first trapping ultrasonic output unit 114, as illustrated in the experimental measurement results illustrated in FIG. 5B, the effect of increasing the temperature inside the phantom due to the focused ultrasound used for trapping does not occur. In other words, the heat convection occurs due to the fluids flow, so the temperature increases to the extent that the phantom suffers heat damage does not occur.

In addition, the phases of the pulse sound wave of the focused ultrasound output from the first ultrasound output unit for trapping 114 and the pulse sound wave of the focused ultrasound output from the second ultrasound output unit for trapping 115 are reversed by 180°. Accordingly, the generated acoustic field takes the form of the node and antinode arranged sequentially, in which the area with high acoustic pressure corresponds to the antinode and the area with low acoustic pressure corresponds to the node.

The acoustic field structure in which the antinode and node are sequentially arranged serves as a blocking structure that controls the movement of the biological tissue, such as thrombus, moving along the flow. The antinode-node acoustic field structure serves to a filter function to prevent the movement of beads and thrombus larger than the spacing of the antinode-node acoustic field array structure and allow the small-sized beads and thrombus to pass.

In the embodiment of the present disclosure, the first ultrasound output unit for trapping 114 and the second ultrasound output unit for trapping 115 are described as an example of outputting the focused ultrasound of 1 MHZ, so the biological tissue with the size of 1 mm or more in diameter may be trapped.

Next, an example in which the biological tissue whose movement is controlled in the above-described biological tissue trapping unit is destroyed in the biological tissue destruction unit will be described with reference to FIG. 6.

Figure 6A:
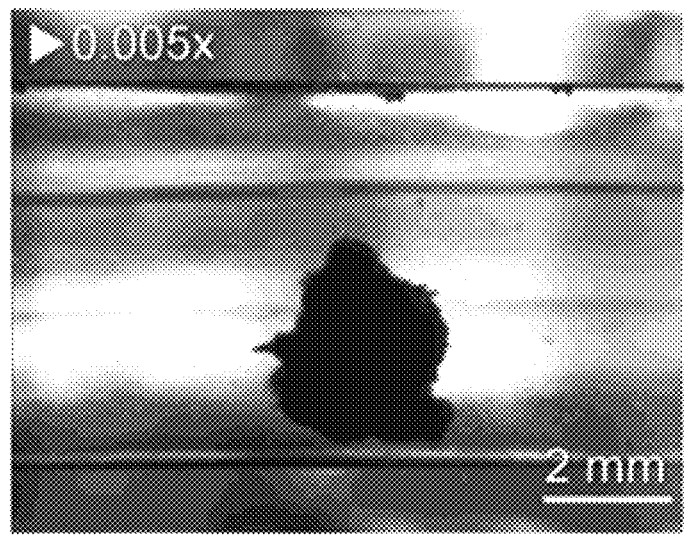
FIGS. 6A to 6C are exemplary diagrams of the destroyed biological tissue according to an embodiment of the present disclosure.
Figure 6B:
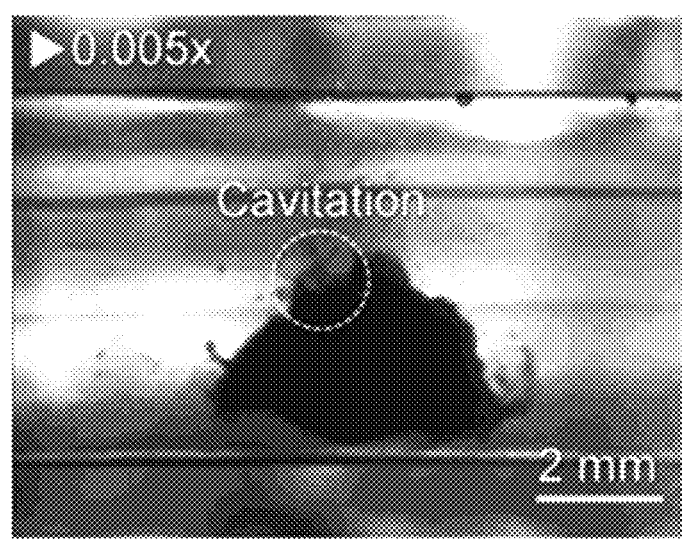
Figure 6C:
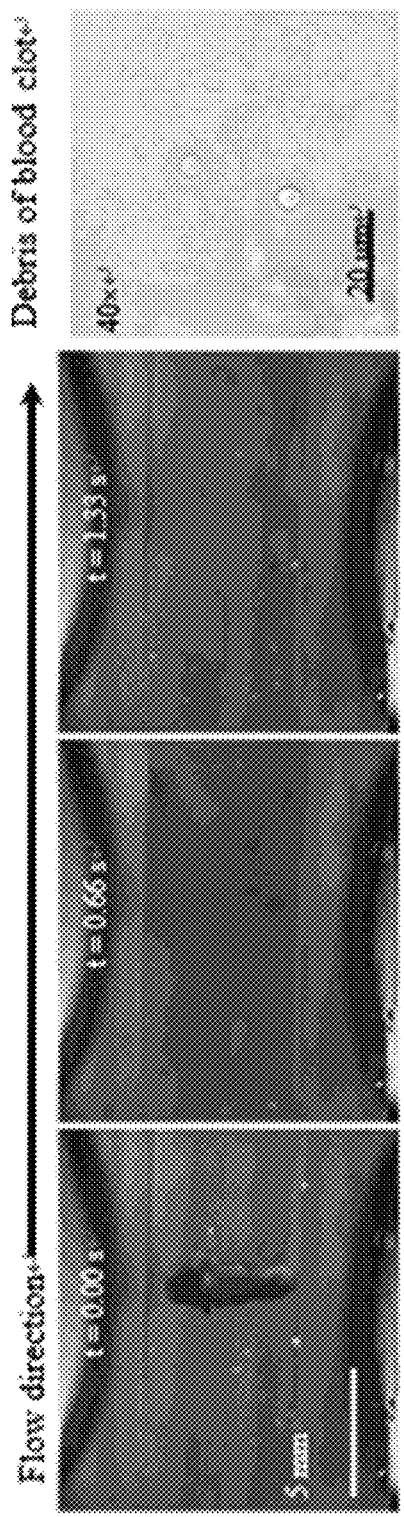

FIGS. 6A to 6C are exemplary diagrams of the destroyed biological tissue according to an embodiment of the present disclosure.

As illustrated in FIG. 6A, the cavitation is generated using the focused ultrasound output from the ultrasound output unit for destruction 123 in the 2 MHz frequency band. The cavitation began to occur within 0.15 ms, and its size was limited to the inside of the blood vessel.

Accordingly, as illustrated in FIG. 6B, it is possible to confirm the cavitation phenomenon that may destroy the biological tissue whose movement is controlled within the blood vessel without damaging the inner surface of the blood vessel. By adjusting the output characteristics of the focused ultrasound for destruction by the fracture control unit 121 according to the actual size of the blood vessel, it is possible to generate the cavitation without damaging the surface of the blood vessel in a very short time.

As illustrated in FIG. 6C, it can be seen that the biological tissue can be destroyed by the focused ultrasound (HIFU)-based boiling histotripsy through the biological tissue destruction unit, and the thrombus larger than 5 mm is destroyed within 1.7 seconds into small fragments with a diameter of 8 μm or less.

In addition, when the degree of destruction of the thrombus was observed by adjusting the output conditions of the focused ultrasound transducer for destruction differently, it can be seen from Table 1 below that the longer the pulse length and the higher the pulse repetition frequency, the smaller the size of the destroyed fragments and the higher the ratio.

TABLE 1

| Pulse length | | Size distribution [%] | | |
|---|---|---|---|---|
| [ms] | PRF [Hz] | d < 18 μm | 18 μm < d < 60 μm | 60 μm < d |
| 3 | 10 | 80.61 | 15.85 | 3.54 |
|  | 20 | 84.14 | 11.53 | 4.33 |
|  | 30 | 83.61 | 14.57 | 1.82 |
| 6 | 10 | 89.16 | 9.41 | 1.43 |
|  | 20 | 87.25 | 11.11 | 1.64 |
|  | 30 | 89.81 | 8.82 | 1.37 |
| 10 | 10 | 83.81 | 14.93 | 1.26 |
|  | 20 | 90.69 | 7.59 | 1.72 |
|  | 30 | 81.98 | 15.80 | 2.22 |

In the experiment shown in Table 1, the pulse length was changed to 3 ms, 6 ms, and 10 ms, and the pulse repetition frequency (PRF) was changed to 10 Hz, 20 Hz, and 30 Hz.

In all the output conditions of the ultrasound output unit for destruction, it was confirmed that a ratio of fragments having a size smaller than the size range (e.g., 18 μm to 60 μm in diameter), in which the embolization may occur, appears 80% or more. Therefore, in order to avoid causing the embolization, in the embodiment of the present disclosure, a procedure of controlling the movement of the remaining biological tissues again and destroying the remaining biological tissues is repeatedly performed.

Next, an example of controlling the movement of the remaining biological tissues will be described with reference to FIG. 7.

Figure 7:
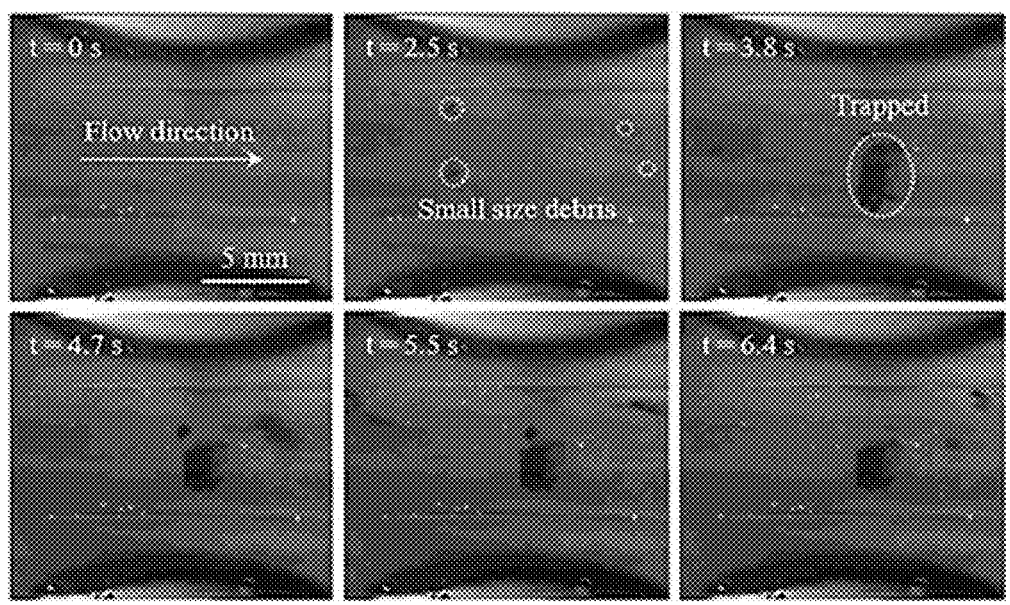
FIG. 7 is an exemplary diagram of remaining biological tissues whose movement is controlled according to an embodiment of the present disclosure.

FIG. 7 is an exemplary diagram of remaining biological tissues whose movement is controlled according to an embodiment of the present disclosure.

As illustrated in FIG. 7, among the biological tissue fragments that are primarily destroyed through the biological tissue destruction unit 120, the movement of biological tissue of a certain size or more may be controlled again by using the second apparatus for destroying biological tissue in the wake of the flow.

In other words, when the focused ultrasound in which the output conditions of two pairs of trapping ultrasound output units whose focus positions match are controlled by the trapping control unit of the biological tissue trapping unit included in the second apparatus for destroying biological tissue are output, it may be trapped by forming the acoustic field structure that may restrict the movement depending on the sizes of the remaining biological tissues.

This is because the fragments of the size that may cause the embolization may remain even after the first step of the destruction of the biological tissue. Therefore, by secondarily controlling the movement of the fragments of the size that may cause the embolization again and destroying the fragments, it is possible to completely destroy them into fragments that are smaller than the size that may cause the embolization.

Next, the results of the apparatus 100 for destroying biological tissue analyzing the acoustic signals during the acoustic trapping using the PAED and the boiling histotripsy based on the focused ultrasound for destruction will be described with reference to FIGS. 8 and 9.

Figure 8:
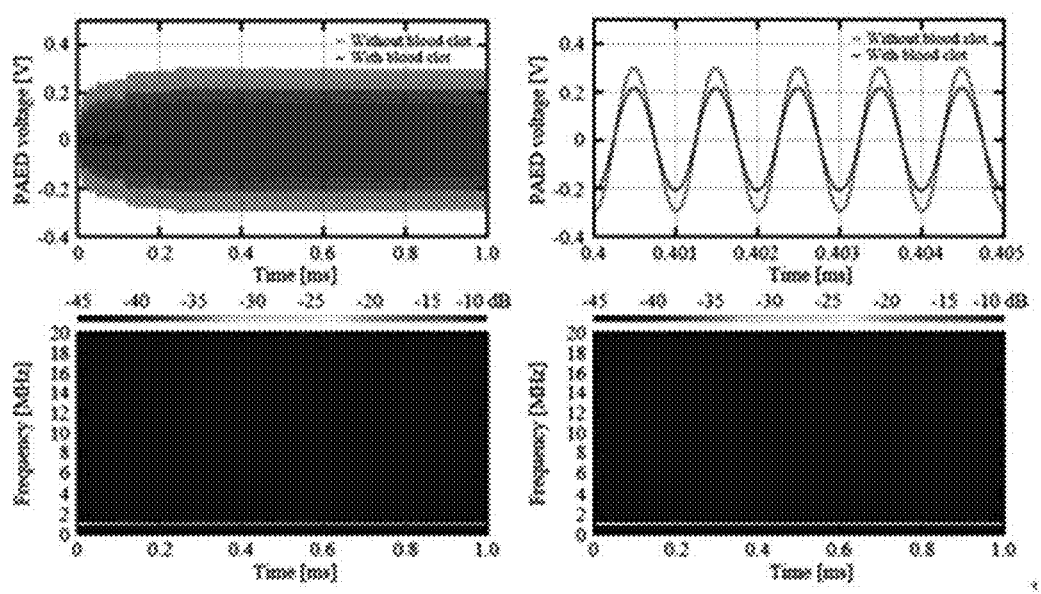
FIGS. 8 and 9 are exemplary diagrams of acoustic signals analyzed according to an embodiment of the present disclosure.
Figure 9:
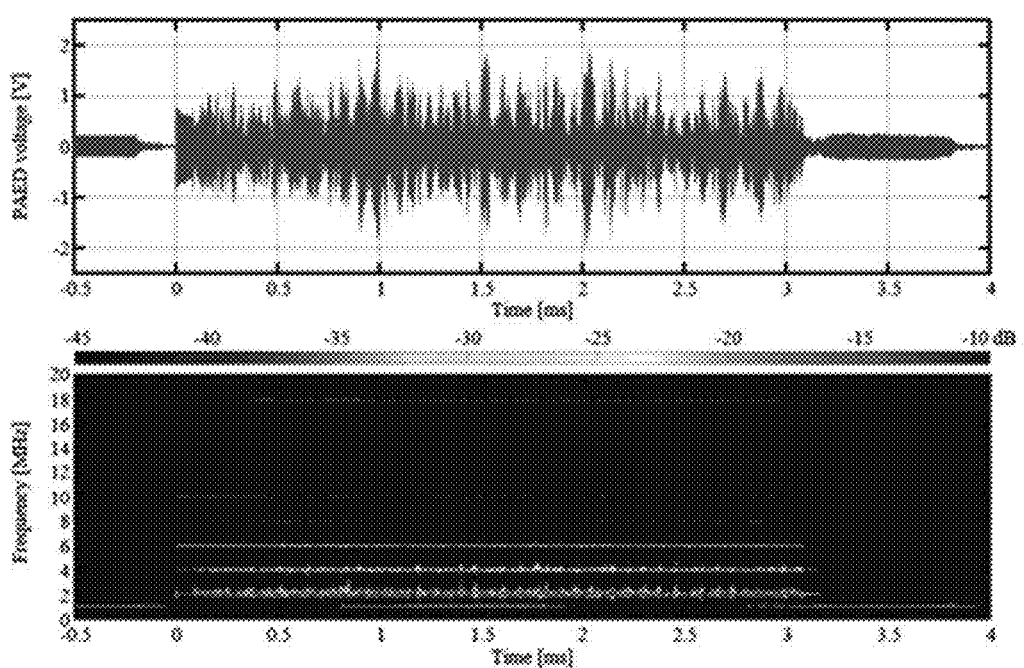

FIGS. 8 and 9 are exemplary diagrams of the acoustic signals analyzed according to an embodiment of the present disclosure.

The PAED may be performed in the embodiment of the present disclosure through the signal analysis unit 130 of FIG. 2 described above. The acoustic signal of 1 MHz scattered by the blood vessel, which is used for the acoustic trapping purposes, appears to have a small peak voltage of the PAED due to the attenuation effect of the biological tissue when the biological tissue is trapped.

Therefore, as illustrated in FIG. 8, the PAED voltage signal was analyzed through a spectrogram, and it was confirmed that the signal appeared in the 1 MHz frequency range.

Meanwhile, as illustrated in FIG. 9, when confirming the PAED signal during destroying the biological tissue with the boiling histotripsy based on the ultrasound output unit for destruction 123 of 2 MHZ, it may be confirmed that the cavitation signal and the acoustic signal due to the trapping are measured simultaneously. In this case, when the measured PAED voltage signal is analyzed with the spectrogram, the signals caused by the trapping unit, the cavitation broadband signal caused by the boiling histotripsy, and the harmonics signal of multiples of 2 MHz may be confirmed in the overlapping signal waveform.

Therefore, it is possible to observe in real time through the signal analysis unit 130 whether the movement of the biological tissue is controlled by the trapping unit and whether the cavitation is generated by the trapping unit.

Figure 10:
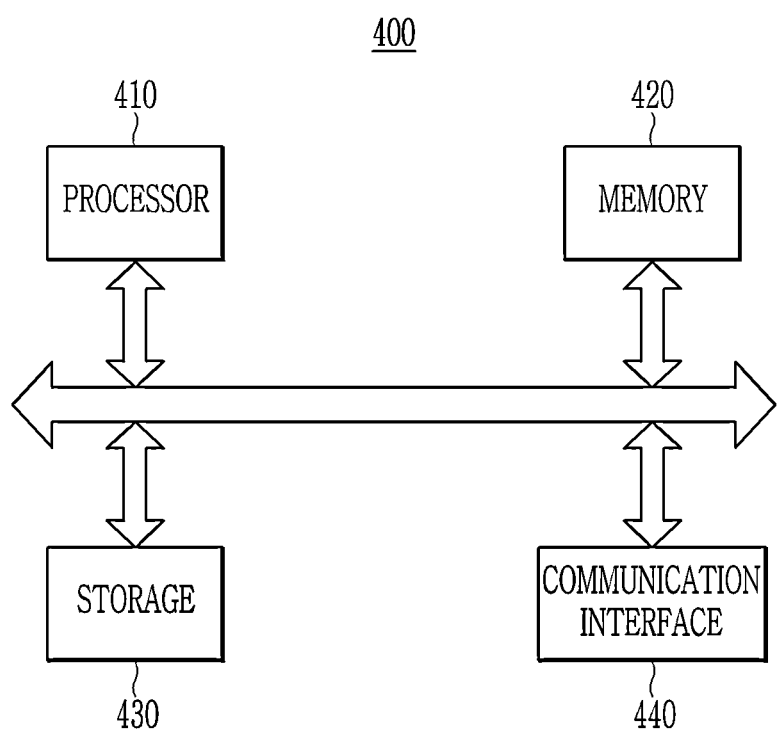
FIG. 10 is a structural diagram of a computing system according to an embodiment of the present disclosure.

FIG. 10 is a structural diagram of a computing system according to an embodiment of the present disclosure.

Referring to FIG. 10, the apparatus 100 for destroying biological tissue operated by at least one processor may be implemented as a computing system 400, and executes programs including instructions described to execute the operation of the present disclosure in the computing system 400. The programs may be stored and distributed in computer-readable storage media.

The hardware of the computing system 400 may include at least one processor 410, a memory 420, a storage 430, and a communication interface 440, and may be connected through a bus. In addition, hardware such as input devices and output devices may be included. The computing system 400 may be equipped with various types of software, including an operating system capable of running programs.

The processor 410 is a device that controls the operation of the computing system 400 and may be various types of processors that process the instructions included in the programs, and may be, for example, a central processing unit (CPU), a microprocessor unit (MPU), a micro controller unit (MCU), a graphic processing unit (GPU), etc.

The memory 420 loads the corresponding program so that the instructions described to execute the operations of the present disclosure are processed by the processor 410. The memory 420 may be, for example, read only memory (ROM), random access memory (RAM), etc. The storage 430 stores various data, programs, etc., required to execute the operations of the present disclosure. The communication interface 440 may be a wired/wireless communication module.

Although embodiments of the present disclosure have been described in detail hereinabove, the scope of the present disclosure is not limited thereto, but may include several modifications and alterations made by those skilled in the art using a basic concept of the present disclosure as defined in the claims.

What is claimed is:

1. A method for operating an apparatus for destroying biological tissue operated by at least one processor, comprising:
    generating a trapping control signal for controlling movement of the biological tissue moving by a fluid;
    generating an acoustic field for controlling the movement of the biological tissue by outputting first focused ultrasounds including a first focused ultrasound for trapping and a second focused ultrasound for trapping based on the trapping control signal, a phase of the first focused ultrasound for trapping and a phase of the second focused ultrasound for trapping being reversed by 180°, and the first focused ultrasound for trapping and the second focused ultrasound for trapping being arranged to face one focal area; and
    outputting a second focused ultrasound based on a destruction control signal generated to destroy the biological tissue whose movement is controlled by the acoustic field.

2. The method of claim 1, wherein
    the generating of the trapping control signal includes:
    receiving a medical image including the biological tissue; and
    generating the destruction control signal for destroying the biological tissue according to characteristics and a size of the biological tissue.

3. The method of claim 1, wherein
    in the generating of the trapping control signal,
    by generating the trapping control signal including a first pulse length, a first pulse repetition frequency, a first ultrasound output frequency, a second pulse length, a second pulse repetition frequency, and a second ultrasound output frequency, the movement of the biological tissue larger than a preset critical size or larger than the size of the biological tissue is controlled.

4. The method of claim 3, wherein
    the first focused ultrasound for trapping has the first pulse length and the first pulse repetition frequency and the second focused ultrasound for trapping has the second pulse length and the second pulse repetition frequency, and
    the acoustic field formed in the fluid using the first focused ultrasound for trapping and the second focused ultrasound for trapping is formed into a plurality of lines by sequentially arranging antinodes and nodes.

5. The method of claim 4, wherein
    an antinode-node spacing and radiation power generated by the antinodes are adjusted by adjusting an ultrasound output of the first pulse repetition frequency and the second pulse repetition frequency, and
    the first focused ultrasound for trapping and the second focused ultrasound for trapping have an ultrasound center frequency of 0.1 MHz to 10 MHZ, a pulse repetition frequency of 0.1 Hz to 100 Hz, a pulse length ranging from 0.1 ms to 1000 ms, a pulse repetition frequency ranging from 0.1 Hz to 500 Hz, and pressure intensity ranging from 0.01 MPa to 5 MPa.

6. The method of claim 1, wherein
    in the outputting of the second focused ultrasound,
    the biological tissue whose movement is controlled by the acoustic field is destroyed using acoustic cavitation generated in a blood vessel including the fluid through the second focused ultrasound.

7. The method of claim 6, wherein
    the second focused ultrasound has an ultrasound center frequency of 0.1 MHz to 10 MHZ, a pulse length ranging from 0.1 ms to 100 ms, a pulse repetition frequency ranging from 0.1 Hz to 500 Hz, and a pressure of a maximum static pressure of 40 MPa or more and a maximum negative pressure of 10 MPa or less.

8. The method of claim 1, further comprising:
    after the outputting of the second focused ultrasound,
    confirming whether the movement of the biological tissue is controlled based on an acoustic signal generated by the output of the first focused ultrasound; and
    confirming whether the biological tissue is destroyed based on an acoustic signal generated by the output of the second focused ultrasound.

9. The method of claim 1, further comprising:
    after the outputting of the second focused ultrasound,
    generating another trapping control signal for controlling the movement of any one of remaining biological tissues that pass through the acoustic field or the remaining biological tissues from which the biological tissue is destroyed;
    generating another acoustic field by outputting a third focused ultrasound based on the another trapping control signal; and
    outputting a fourth focused ultrasound based on another destruction control signal for destroying the remaining biological tissues whose movement is controlled by the another acoustic field.

10. The method of claim 1, wherein
    the generating of the trapping control signal further includes
    generating the trapping control signal when a driving start signal of the apparatus for destroying biological tissue is generated or an ultrasound image including the biological tissue is input from a probe linked to the apparatus for destroying biological tissue.

11. An apparatus for destroying biological tissue operated by at least one processor, comprising:
    a memory configured to store one or more instructions; and a processor that when executing the one or more instructions is configured to:
generate a trapping control signal for controlling movement of the biological tissue moving by a fluid and generating an acoustic field for controlling the movement of the biological tissue by outputting first focused ultrasounds including a first focused ultrasound for trapping and a second focused ultrasound for trapping based on the trapping control signal, a phase of the first focused ultrasound for trapping and a phase of the second focused ultrasound for trapping being reversed by 180°, and the first focused ultrasound for trapping and the second focused ultrasound for trapping being arranged to face one focal area; and
generate a destruction control signal for destroying the biological tissue whose movement is controlled based on the acoustic field and outputting a second focused ultrasound based on the destruction control signal for destroying the biological tissue whose movement is controlled by the acoustic field.

12. The apparatus of claim 11, wherein
the processor is further configured to:
generate a trapping control signal including a first pulse length, a first pulse repetition frequency, a first ultrasound output frequency, a second pulse length, a second pulse repetition frequency, and a second ultrasound output frequency;
output the first focused ultrasound for trapping based on the first pulse length and the first pulse repetition frequency; and
output the second focused ultrasound for trapping based on the second pulse length and the second pulse repetition frequency.

13. The apparatus of claim 12, wherein
the acoustic field formed in the fluid using the first focused ultrasound for trapping and the second focused ultrasound for control is formed into a plurality of lines by sequentially arranging antinodes and nodes.

14. The apparatus of claim 13, wherein
the processor is further configured to maintain an angular range of each ultrasound irradiation axis between 10° and 180°.

15. The apparatus of claim 14, wherein
the first focused ultrasound for trapping and the second focused ultrasound for trapping has an ultrasound center frequency of 0.1 MHz to 10 MHZ, a pulse length ranging from 0.1 ms to 1000 ms, a pulse repetition frequency ranging from 0.1 Hz to 500 Hz, and pressure intensity ranging from 0.01 MPa to 5 MPa.

16. The apparatus of claim 11, wherein
the processor is further configured to:
generate the destruction control signal for destroying the biological tissue according to characteristics and size of the biological tissue; and
output the second focused ultrasound based on the destruction control signal for destroying the biological tissue whose movement is controlled by the acoustic field.

17. The apparatus of claim 16, wherein
the processor is further configured to:
destroy the biological tissue using a first method when a size of a blood vessel diameter through which the fluid flows is larger than a preset size, and
destroy the biological tissue using a second method when the size of the blood vessel diameter is smaller than the preset size, and
the first method and the second method each are any one of boiling histotripsy or variable pressure shock wave histotripsy.

18. The apparatus of claim 11, wherein
the processor is further configured to perform passive acoustic emission detection (PAED) that confirms whether the movement of the biological tissue is controlled based on an acoustic signal generated by the output of the first focused ultrasound, and whether the biological tissue is destroyed based on an acoustic signal generated by the output of the second focused ultrasound.

* * * * *